United States Patent
Shedge et al.

(10) Patent No.: US 11,567,873 B1
(45) Date of Patent: Jan. 31, 2023

(54) EXTENDED CACHE FOR EFFICIENT OBJECT STORE ACCESS BY A DATABASE

(71) Applicant: SAP SE, Walldorf (DE)

(72) Inventors: Sagar Shedge, Pune (IN); Nishant Sharma, Pune (IN); Nawab Alam, Bhilai (IN); Mohammed Abouzour, Waterloo (CA); Gunes Aluc, Waterloo (CA); Anant Agarwal, Pune (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/486,206

(22) Filed: Sep. 27, 2021

(51) Int. Cl.
| | |
|---|---|
| *G06F 12/0862* | (2016.01) |
| *G06F 12/0891* | (2016.01) |
| *G06F 13/16* | (2006.01) |
| *G06F 12/123* | (2016.01) |
| *G06F 12/0882* | (2016.01) |
| *G06F 12/0808* | (2016.01) |

(52) U.S. Cl.
CPC ...... *G06F 12/0862* (2013.01); *G06F 12/0808* (2013.01); *G06F 12/0882* (2013.01); *G06F 12/0891* (2013.01); *G06F 12/123* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 5,469,555 | A * | 11/1995 | Ghosh | G06F 12/0888 711/143 |
| 5,895,485 | A * | 4/1999 | Loechel | G06F 12/0804 711/119 |
| 10,061,792 | B2 | 8/2018 | Agarwal et al. | |
| 2013/0185511 | A1* | 7/2013 | Sassone | G06F 12/0804 711/119 |
| 2014/0095775 | A1* | 4/2014 | Talagala | G06F 12/0891 711/103 |
| 2018/0150240 | A1* | 5/2018 | Bernat | G06F 21/57 |

(Continued)

OTHER PUBLICATIONS

"Alibaba Cloud Object Storage Service," Alibaba Cloud, printed Sep. 22, 2021, from https://www.alibabacloud.com/product/oss, 7 pages, Copyright 2009-2021.

(Continued)

*Primary Examiner* — William E. Baughman
(74) *Attorney, Agent, or Firm* — Sterne, Kessler, Goldstein & Fox P.L.L.C.

(57) ABSTRACT

Disclosed herein are system, method, and computer program product embodiments for utilizing an extended cache to access an object store efficiently. An embodiment operates by executing a database transaction, thereby causing pages to be written from a buffer cache to an extended cache and to an object store. The embodiment determines a transaction type of the database transaction. The transaction type can a read-only transaction or an update transaction. The embodiment determines a phase of the database transaction based on the determined transaction type. The phase can be an execution phase or a commit phase. The embodiment then applies a caching policy to the extended cache for the evicted pages based on the determined transaction type of the database transaction and the determined phase of the database transaction.

20 Claims, 4 Drawing Sheets

(56) References Cited

U.S. PATENT DOCUMENTS

2022/0100425 A1* 3/2022 Ryu ..................... G06F 3/0611

OTHER PUBLICATIONS

"Amazon EBS volume types," Amazon Web Services, Inc., printed Sep. 22, 2021, from https://www.docs.aws.amazon.com/AWSEC2/latest/UserGuide/ebs-volume-types.html, 14 pages, Copyright 2021.
"Amazon Elastic Block Store (EBS)," Amazon Web Services, Inc., printed Sep. 22, 2021, from https://aws.amazon.com/ebs/, 5 pages, Copyright 2021.
"Amazon EC2," Amazon Web Services, Inc., printed Sep. 22, 2021, from https://aws.amazon.com/ec2/, 9 pages, Copyright 2021.
"Amazon S3," Amazon Web Services, Inc., printed Sep. 22, 2021, from http://aws.amazon.com/s3/, 10 pages, Copyright 2021.
"Apache Hudi!" printed Sep. 22, 2021, from https://hudi.apache.org/, 2 pages.
"Apache Spark—Lightning-fast unified analytics engine," The Apache Software Foundation, printed Sep. 22, 2021, from https://hudi.apache.org/, 4 pages, Copyright 2018.
"Azure Blob Storage," printed Sep. 22, 2021, from https://azure.microsoft.com/en-us/services/storage/blobs/, 14 pages.
"Dremio," Dremio, printed Sep. 22, 2021, from https://www.dremio.com/product/, 9 pages, Copyright 2021.
"BigQuery," Google, printed Sep. 22, 2021, from https://cloud.google.com/bigquery/, 19 pages.
"Cloud Storage," Google, printed Sep. 22, 2021 from https://cloud.google.com/storage/, 15 pages.
"SAP IQ," printed Sep. 22, 2021 from https://www.sap.com/canada/products/sybase-iq-big-data-management.html/, 5 pages.
"TPC Benchmark H Standard Specification Revision 3.0.0," Transaction Processing Performing Council, 138 pages (Copyright 1993-2021).
Abouzour, M. et al., "Bringing Cloud-Native Storage to SAP IQ," SIGMOD '21, pp. 2410-2422 (Jun. 20-25, 2021).
Armbrust, M. et al., "Delta Lake: High-Performance ACID Table Storage over Cloud Object Stores," Proc. of the VLDB Endowment, vol. 13, No. 12, pp. 3411-3424 (2020).
Berenson, H. et al., "A Critique of ANSI SQL Isolation Levels," Techincal Report MSR-TR-95-51, 13 pages (Jun. 1995).
Camacho-Rodriguez, J. et al., "Apache Hive: From MapReduce to Enterprise-grade Big Data Warehousing," SIGMOD '19, pp. 1773-1786 (2019).
Cooper, B.F. et al., "PNUTS to Sherpa: Lessons from Yahool's Cloud Database," Proc. of the VLDB Endowment, vol. 12, No. 12, pp. 2300-2307 (2019).
Dageville, B. et al., "The Snowflake Elastic Data Warehouse," SIGMOD/PODS '16, pp. 215-226 (2016).
Decandia, G. et al., "Dynamo: Amazon's Highly Available Key-value Store," SOSP 2007, pp. 205-2020 (2007).
Gupta, A. et al., "Amazon Redshift and the Case for Simpler Data Warehouse," SIGMOD '15, pp. 1917-1923 (2015).
Jia, C. & Haoyuan, L., "Virtual Distributed File System: Alluxio," Encyclopedia of Big Data Technologies, pp. 1753-1758 (2019).
Lamb, A. et al., "The Vertica Analytic Database: C-Store 7 Years Later," Proc. of the VLDB Endowment, vol. 5, No. 12, pp. 1790-1801 (2012).
Ramakrishnan, R. et al., "Azure Data Lake Store: A Hyperscale Distributed File Service for Big Data Analytics," SIGMOD '17, pp. 51-63 (2017).
Sethi, R. et al., "Presto: SQL on Everything," Proc. of the 2019 IEEE International Conference on Data Engineering, ICDE, pp. 1802-1813 (2019).
Tan, J. et al., "Choosing a Cloud DBMS: Architectures and Tradeoffs," Proc. of the VLDB Endowment, vol. 12, No. 12, pp. 2170-2182 (2019).
Vandiver, B. et al., "Eon Mode: Bringing the Vertica Columnar Database to the Cloud," SIGMOD 2018, pp. 797-809 (2018).

* cited by examiner

EXTENDED CACHE FOR EFFICIENT OBJECT STORE ACCESS BY A DATABASE

BACKGROUND

Many cloud-native database systems store data directly in an object store. This can reduce storage and compute costs. In addition, these cloud-native database systems often benefit from the greater elasticity and scale-out properties offered by the cloud. However, performing read and write operations on an object store is often associated with higher latencies. Moreover, because random access memory (RAM) is often more expensive on the cloud, it is often not possible to use a buffer manager that relies purely on RAM to alleviate these higher latencies.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for utilizing an extended cache to access an object store efficiently.

Figure 1:
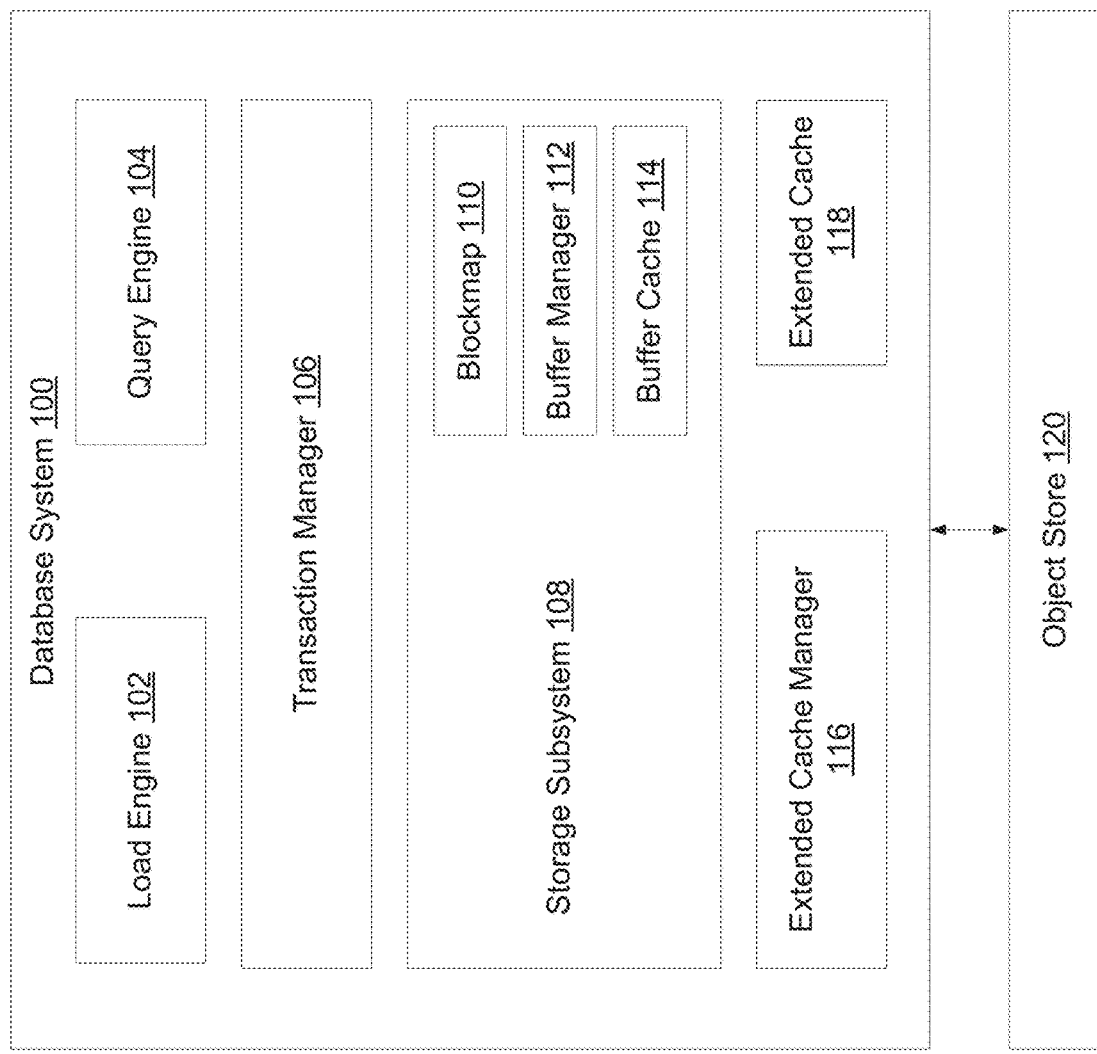
FIG. 1 is a block diagram of a database system that uses an extended cache to access an object store efficiently, according to some embodiments.

FIG. 1 illustrates a database system 100 that uses an extended cache to access an object store efficiently, according to some embodiments. Database system 100 may be a traditional database management system (DBMS) implemented on a server computer. Database system 100 may also be a cloud database. Database system 100 may include a load engine 102, query engine 104, transaction manager 106, storage subsystem 108, extended cache manager 116, and extended cache 118. Storage subsystem 108 may include a blockmap 110, buffer manager 112, and buffer cache 114.

Load engine 102 may load data received from a source system into database system 100. Load engine 102 may also validate the data received from the source system.

Query engine 104 may interpret a query received from a user via an application program into instructions for accessing data in database system 100. For example, query engine 104 may process data manipulation language (DML) statements (e.g. Structured Query Language (SQL) statements) into instructions for manipulating data in database system 100.

Transaction manager 106 may control concurrent access to data in database system 100 by performing operations in a scheduled way. This can ensure that the data in database system 100 remains in a consistent state before and after execution of a transaction.

Buffer manager 112 may manage buffer cache 114. For example, buffer manager 112 may manage pages in buffer cache 114 according to blockmap 110. Buffer cache 114 may be a high-speed cache of small size (e.g., RAM).

Extended cache manager 116 may manage extended cache 118. Extended cache 118 may be slower and bigger than buffer cache 114. For example, extended cache 118 may be a solid-state drive (SSD).

Object store 120 may be a data store that manages data as objects. Object store 120 may be slower and bigger than extended cache 118. For example, object store 120 may be a data store such as, but not limited to, Amazon Web Services S3, Microsoft Azure Blob Storage, or Google Cloud Storage. Database system 100 may store data directly in object store 120 via a communication network such as, but not limited to, the Internet.

Database system 100 may execute a database transaction in response to query engine 104 receiving a query. When database system 100 performs the database transaction, database system 100 may issue one or more input/output (I/O) operations to buffer cache 114, extended cache 118, and/or object store 120 to complete the database transaction. Database system 100 may read and write data associated with the database transaction across buffer cache 114, extended cache 118, and/or object store 120 to improve I/O operation latency while minimizing increases in money, heat, and energy associated with increasing the size of buffer cache 114.

Database system 100 may handle the I/O operations using pages. A page may be a fixed-length contiguous block of storage. Database system 100 may store data associated with a database transaction as one or more pages in buffer cache 114, extended cache 118, and/or object store 120. Because buffer cache 114 may be smaller than extended cache 118, database system 100 may occasionally move pages from buffer cache 114 to extended cache 118, which may be slower and bigger than buffer cache 114. Similarly, because extended cache 118 may be smaller than object store 120, database system 100 may occasionally move pages from extended cache 118 to object store 120, which may be slower and bigger than extended cache 118. When a database transaction is committed, database system 100 can flush (or may be required to flush) the updated pages in buffer cache 114 and/or extended cache 118 to object store 120 for permanent storage.

Database system 100 may differentiate between the logical (e.g., in-memory) and the physical (e.g., on-disk) representation of a page. For example, query engine 104 may be oblivious to how a page is physically stored. Instead, query engine 104 may request a page from buffer manager 112. The request may be in the form of <logical-page-number, version-counter>. In response, buffer manager 112 may locate the correct version of the page from buffer cache 114 according to the logical-page-number and version-counter. If the page is not in buffer cache 114, database system 100 may look up the page in extended cache 118. If the page is not in extended cache 118, database system 100 may retrieve the page from object store 120. Buffer manager 112 may also cache the retrieved page in buffer cache 114 for later use.

Figure 2:
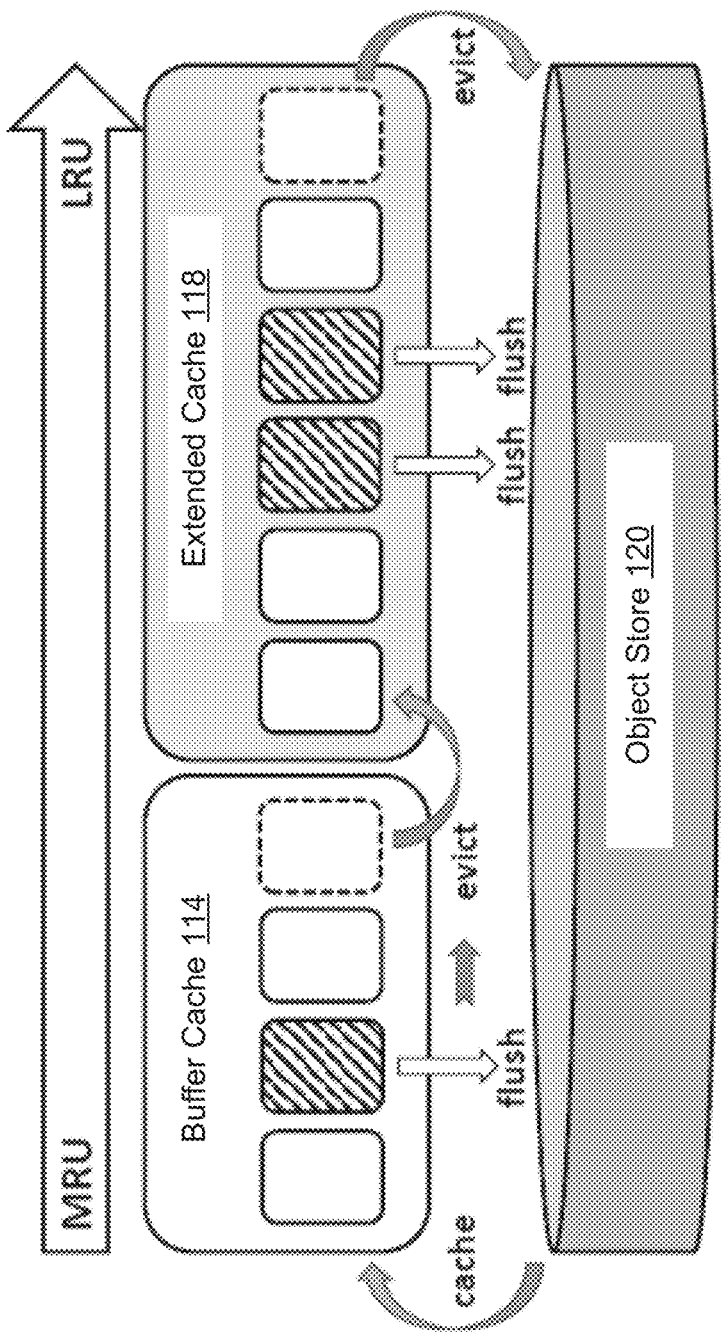
FIG. 2 is a block diagram illustrating the movement of pages between a buffer cache, an extended cache, and an object store, according to some embodiments.

FIG. 2 illustrates the movement of pages between buffer cache 114, extended cache 118, and object store 120, according to some embodiments. FIG. 2 is described with reference to FIG. 1. However, FIG. 2 is not limited to that example embodiment.

In response to a request for a page, buffer manager 112 may retrieve the correct version of the page (e.g., from buffer cache 114, extended cache 118, or object store 120). Buffer manager 112 may cache the retrieved page in buffer cache 114. Buffer manager 112 may store pages in a queue of buffer cache 114 organized from most recently used to least recently used (e.g., according to a least recently used (LRU) policy). Thus, buffer manager 121 may store the retrieved page at the most recently used end of the queue of buffer cache 114. In this approach, as a page ages in buffer cache 114, buffer manager 112 may eventually evict the page from buffer cache 114. Once evicted, extended cache manager 116 can store the page in extended cache 118.

Similarly, extended cache manger 116 may store pages in extended cache 118 according to a LRU policy. For example, extended cache manger 116 may store pages in directories in extended cache 118. Extended cache manger 116 may also store pages in extended cache 118 using various other approaches as would be appreciated by a person of ordinary skill in the art.

As a page ages in extended cache 118, extended cache manger 116 may eventually evict the page from extended cache 118. Once evicted, depending on the page's dirty state, extended cache 118 can store the page in object store 120 or discard it.

Before database system 100 commits a database transaction, database system 100 may confirm that dirty pages associated with the database transaction are stored (or flushed) to object store 120 for permanent storage. This is because the database transaction may have dirty pages in buffer cache 114, extended cache 118, or both.

Every time a dirty page is flushed from buffer cache 114, database system 100 may store the dirty page in object store 120 using a new object key for the page. This can allow database system 100 to ensure that every page that is stored in object store 120 has exactly one version, thereby enabling database system 100 to achieve read-after-write consistency.

Moreover, when database system 100 flushes a dirty page from buffer cache 114, database system 100 may also store the dirty page in extended cache 118, with the assumption that the page is still recent, and therefore, that the page will likely be re-read.

In general, a database system often has to evict or flush pages to an object store (e.g., object store 120). Similarly, the database system often has to read evicted or flushed pages from the object store. However, when the database system performs read and write operations on an object store, it often suffers from significantly higher latencies than when it performs read and write operations to a buffer cache or an extended cache. Moreover, it is often not possible for the database system to utilize a buffer manager that relies purely on RAM to alleviate these higher latencies. This is often because RAM is significantly more expensive than other forms of storage (e.g., a hard disk drive), particularly in cloud computing environments. To counteract the impact of higher latencies without utilizing more RAM, the database system may use an extended cache to access an object store. However, using an extended cache to access an object store may actually degrade performance as opposed to improving it because extended caches often have limited bandwidth compared to object stores. Embodiments herein solve these technological problems.

Embodiments herein solve these technological problems using extended cache manager 116. First, extended cache manager 116 can solve these technological problems by using a unique physical layout for extended cache 118. Second, extended cache manager 116 can solve these technological problems by using a unique hybrid caching policy that makes the best use of extended cache 118's bandwidth while still exploiting the low I/O latencies that the extended cache 118 offers. Finally, extended cache manager 116 can solve these technological problems by redirecting a varying percentage of I/O operations to object store 120, thereby gracefully handling workloads that saturate the bandwidth of extended cache 118.

Through these technological solutions, extended cache manager 116 can provide the following benefits. First, extended cache manager 116 can increase the capacity of buffer cache 114 managed by buffer manager 112 without altering buffer manager 112's paging behavior. Second, extended cache manager 116 can optimize buffer manager 112's caching for typical Online Analytical Processing (OLAP) workloads. Third, extended cache manager 116's presence in database system 100 does not affect transactional consistency. Finally, reading and writing to an object store (e.g., object store 120) typically incurs a cost. Extended cache manager 116 can reduce some reads from the object store thereby reducing this cost.

Extended cache manager 116 can solve the above technological problems by using a unique physical layout for extended cache 118. In some embodiments, extended cache manager 116 can store all pages in extended cache 118 in a flat file. In some other embodiments, extended cache manager 116 can store each page in extended cache 118 as a separate file within a directory structure maintained by the operating system (OS).

In embodiments involving storing each page as a separate file within a directory structure, extended cache manager 116 may use two approaches. First, extended cache manager 116 may store each page as a file under a single directory. Second, extended cache manager 116 may store each page as a file under a tree of sub-directories. This latter approach may increase database system 100's write performance to extended cache 118 compared to storing each page as a file under a single directory. Moreover, this increase in write performance may depend on the choice of file system utilized by extended cache 118.

In embodiments involving storing each page as a separate file within a directory structure, it is often important for extended cache manager 116 to maintain a balanced directory structure to maintain good read and write performance to extended cache 118. To solve this technological problem of how to maintain a balanced directory structure, extended cache manager 116 can utilize a unique hashing algorithm to generate directory path prefixes for the pages.

Extended cache manager 116 can generate a directory path prefix for a page based on the following variables: k, f and h. The variable k can refer to an object key (or equivalently a file name) that uniquely identifies the page. The variable f can refer to the fanout that determines the maximum number of subdirectories allowed in a directory. The variable f may be a power of 2. The variable h can refer to the maximum height of the directory tree.

Extended cache manager 116 can generate a directory path prefix for a page identified by the object key k as follows. Initially, extended cache manager 116 can compute a hash value v for the object key k using a hash function hash that maps object keys to integers (e.g., 64-bit unsigned integers). The hash function hash can be any hash function including, but not limited to, secure hash algorithm (SHA) and message digest (MD). For example, for an object key $k=2^{62}+1=4,611,868,018,427,387,905$, hash(k) may return 654231.

Extended cache manager 116 can then represent the hash value v in radix-f where/refers to the fanout. For example, when f=32, extended cache manager 116 can represent hash value v 65431 in radix-32 as [19][30][31][17].

Finally, extended cache manager 116 can use the h least significant digits for the hash value v represented in radix-f as the directory names of the path. For example, when h=2, extended cache manager 116 can use the 2 least significant digits of [19][30][31][17] to construct the path to the page identified by object key k=4,611,868,018,427,387,905. For example, extended cache manager 116 can construct the path to the page identified by object key k as /ecm-cache-location/31/17/4,611,868,018,427,387,905.

Extended cache manager 116 can also solve the above technological problems by using a unique hybrid caching policy that makes the best use of extended cache 118's bandwidth while still exploiting the low I/O latencies that extended cache 118 offers.

As discussed above, database system 100 may execute various database transactions. For example, database system 110 may execute a typical OLAP workload consisting of (i) read-only transactions, which may make up the majority of the workload, and (ii) update transactions. Extended cache manager 116 may apply a hybrid caching policy to extended cache 118 to improve bandwidth utilization of extended cache 118. For example, extended cache manager 116 may apply a different caching policy to extended cache 118 based on (i) the database transaction type (e.g., a read-only transaction or an update transaction) and (ii) the phase of the database transaction (e.g., execution or commit).

First, database system 100 may use various caching policies in the case of read-only database transactions. In the case of a read-only database transaction and a cold cache (e.g., where pages associated with the read-only transaction have not been cached in buffer cache 114 or extended cache 118), database system 100 may read pages from object store 120 and cache them in buffer cache 114. However, as discussed above, database system 100 may not be able to cache every page in buffer cache 114 because it is of limited size.

To counteract this, extended cache manager 116 may extend the capacity of buffer cache 114 using extended cache 118. Extended cache manager 116 may extend the capacity of buffer cache 114 in various ways. In some embodiments, extended cache manager 116 may extend the capacity of buffer cache 114 through read-through caching. For example, every time database system 100 reads a page from object store 120, extended cache manager 114 may asynchronously cache the page in extended cache 118.

In some other embodiments, every time database system 100 evicts a page from buffer cache 114, extended cache manager 116 may cache the page in extended cache 118. In this case, extended cache 118 can act as swap cache for buffer cache 114, and naturally extends buffer cache 114's capacity. Moreover, this can improve I/O latency because the evicted pages can be retrieved from extended cache 118 at a much lower latency compared to retrieving them from object store 120.

Moreover, in the case of read-only database transactions, database system 100 may (1) read pages synchronously from object store 120 for immediate use or (2) prefetch them from object store 120 for potential use in the future. When database system 100 reads pages synchronously from object store 120, database system 100 may store the pages in buffer cache 114 so that query engine 104 can immediately start operating on the pages. On the other hand, when database system 100 prefetches a page from object store 120, database system 100 may either store the page in buffer cache 114 or extended cache 118.

Query engine 104 may end up using every prefetched page. Therefore, if database system 100 stores all prefetched pages in buffer cache 114, there is a chance that some of the prefetched pages needed by query engine 104 may be prematurely evicted from buffer cache 114 before they are needed. This may be because of cache pressure in buffer cache 114 arising from an abundance of prefetched pages. This technological problem may be exacerbated when the size of buffer cache 114 is small.

To solve this technological problem, database system 100 may store only a randomly selected subset of prefetched pages in buffer cache 114. Database system 100 may store the remaining prefetched pages in extended cache 118. Database system 100 may select the amount of randomly selected prefetched pages to store in buffer cache 114 based on the ratio of the size of buffer cache 114 to the size of all caches (e.g., buffer cache 114 and extended cache 118).

Second, in the case of an update database transaction, database system 100 may apply a different caching policy depending on the phase of the update database transaction, namely an execution phase or a commit phase.

During the execution phase, the update database transaction may create new pages because data are being ingested into the database or read existing pages and create new versions of these pages (e.g., copy-on-write semantics). Database system 100 may apply a write-back cache policy to extended cache 118 based on the update database transaction being in an execution phase. For example, as pages are evicted from buffer cache 114 due to cache pressure, extended cache manager 116 can synchronously write the evicted pages to extended cache 118 while asynchronously writing the evicted pages to object store 120. Thus, the latency of the write operation is determined by the latency of extended cache 118. Because the latency of extended cache 118 (e.g., an SSD) may be significantly smaller than the latency of object store 120, this is often desirable. If for some reason the update database transaction needs to be rolled back or aborted, the pages may eventually get discarded during an evict operation of extended cache 118.

Database system 100 may use the write-back policy for extended cache 118 until the update database transaction declares an intent to commit, after which database system 100 may switch to a write-through policy. During the commit phase, database system 100 may write out every page that is created or updated by the update database transaction to object store 120. Database system 100 may apply a write-through cache policy to extended cache 118 based on the update database transaction being in a commit phase. For example, extended cache manager 116 can asynchronously write the created or updated pages to extended cache 118 while synchronously writing the created or updated pages to object store 120. Thus, the latency of the write operation is determined by the latency of object store 120.

While database system 100 may apply the write-back cache policy to extended cache 118 immediately, there may exist write-through pages (e.g., evicted pages) in extended cache manager 116 prior to applying the write-back cache policy. Extended cache manger 116 may write these pages to object store 120 first. For example, extended cache manager 116 may give higher priority to writing the write-through pages that existed prior to applying the write-back cache policy to object store 120.

Finally, extended cache manager 116 can solve the above technological problems by redirecting a varying percentage of I/O operations to object store 120, thereby gracefully handling workloads that saturate the bandwidth of extended cache 118. An extended cache (e.g., extended cache 118) often offers low random I/O latency at a valuable price performance point. However, the extended cache may also suffer from limited bandwidth, especially in comparison to an object store (e.g., object store 120). Consequently, under busty workloads, using the extended cache as a sole backbone of a secondary cache may have performance implications. For example, under heavy workloads where the extended cache needs to serve a large number of read/write requests all at once, the average latency of the extended cache may be higher than the object store (e.g., exceeding 50 milliseconds).

To solve this technological problem, extended cache manager 116 may use the above techniques to prioritize I/O operations and to take advantage of the fact that some operations can be deferred to a later stage in the database transaction execution. In addition to these techniques, extended cache manager 116 may monitor the latency of completed I/O operations on both extended cache 118 and object store 120, and re-direct I/O operations originally intended for extended cache 118 to object store 120 instead. In other words, extended cache manager 116 can fully utilize the bandwidth of extended cache 118 before resorting to object store 120. As a result, extended cache manager 116 can benefit from the low latency of the extended cache 118 while not being restricted to its bandwidth.

To determine if extended cache 118's bandwidth is saturated, extended cache manager 116 can monitor and compare the response times of reads and writes to extended cache 118 to those on object store 120. Extended cache manager 116 can maintain a simple average of response times. Extended cache manager 116 can also rely on an exponential average of response times, which places a greater emphasis on recent observations and thereby avoids the problem of the average being disproportionally skewed by historical values. Extended cache manager 116 can rely on various other response time calculations as would be appreciated by a person of ordinary skill in the art.

To maintain up-to-date information about the response times on object store 120, extended cache manager 116 can always re-direct a small percentage of I/O requests to object store 120 regardless of whether extended cache 118's bandwidth is saturated. As the response times for extended cache 118 increase, extended cache manger 116 can re-direct a percentage of I/O requests to object store 120 according to the following formula.

$$\alpha + (100 - \alpha) \times \text{MIN}\left(1, \frac{rt(\text{extended cache 118})}{rt(\text{object store 120})}\right)$$

α can denote the minimum percentage of I/O requests (e.g., 5%) that extended cache manager 116 always redirects to object store 120. rt(extended cache 118) can denote the response time (e.g., exponential average or simple average) observed on extended cache 118. rt(object store 120) can denote the response time (e.g., exponential average or simple average) observed on extended cache 118.

Figure 3:
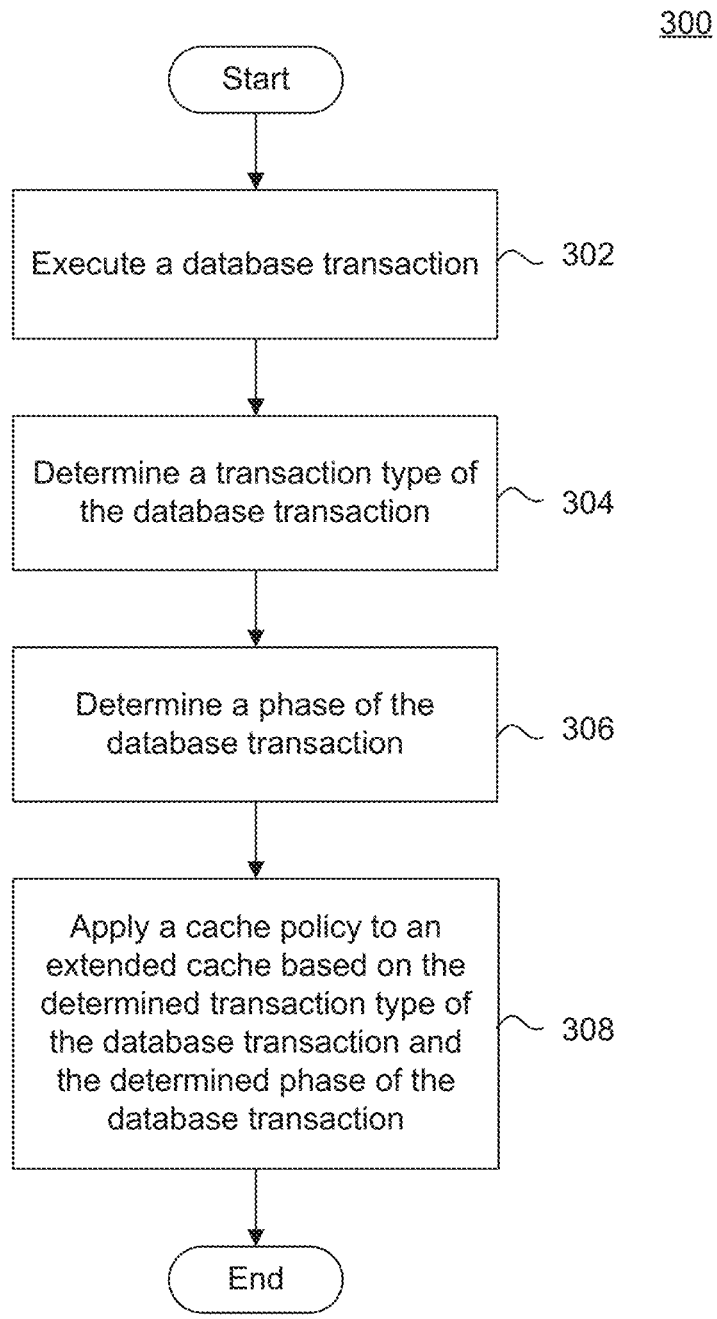
FIG. 3 is a flowchart illustrating a process for using an extended cache to access an object store efficiently, according to some embodiments.

FIG. 3 is a flowchart for a method 300 for using an extended cache to access an object store efficiently, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, database system 100 executes a database transaction, thereby causing pages to be written from buffer cache 114 to extended cache 118 and object store 120.

Database system 100 can prefetch pages from object store 120 for storage in buffer cache 114 and extended cache 118. Database system 100 can randomly select a first subset of prefetched pages from a set of prefetched pages in object store 120 based a ratio between a size of buffer cache 114 to a total cache size. The total cache size may be based on the size of buffer cache 114 and the size of extended cache 118. Database system 100 can select a second subset of prefetched pages from the set of prefetched pages in object store 120 based on the second subset of prefetched pages being absent in the first subset of prefetched pages. Database system 100 can store the first subset of prefetched pages in buffer cache 114. Database system 100 can store the second subset of prefetched pages in extended cache 118.

Extended cache manager 116 can store a page associated with the database transaction in extended cache 118 as a file. For example, extended cache manager 116 can generate a hash value of an object key (or equivalently a file name) of the page using a hash function. The hash function can be any hash function including, but not limited to, secure hash algorithm (SHA) and message digest (MD). Extended cache manager 116 can convert the hash value to a radix value based on a first maximum value. The first maximum number value can represent a maximum number of subdirectories allowed in a directory. The first maximum value can also be referred to as a fanout. In other words, extended cache manager 116 can represent the hash value in radix-f where refers to the fanout. Extended cache manager 116 can then generate a directory path based on the radix value and a second maximum value. The second maximum value can represent a maximum height of a directory tree. For example, extended cache manager 116 can use the second maximum value least significant digits of the hash value represented in radix-f as the directory names of the directory path. Extended cache manager 116 can then store the page in extended cache 118 based on the generated directory path.

Extended cache manager 116 can also determine a first input/output (I/O) response time to extended cache 118. Extended cache manager 116 can determine a second I/O response time to object store 120. Extended cache manager 116 can re-direct a percentage of I/O requests for extended cache 118 to object store 120 based on the first I/O response time, the second I/O response time, and a minimum value. The minimum value can represent a minimum percentage of I/O requests to be redirected to object store 120.

For example, extended cache manger 116 can re-direct a percentage of I/O requests to object store 120 according to the following formula.

$$\alpha + (100 - \alpha) \times \text{MIN}\left(1, \frac{rt(\text{extended cache 118})}{rt(\text{object store 120})}\right)$$

α can denote the minimum percentage of I/O requests (e.g., 5%) that extended cache manager 116 always redirects to object store 120. rt(extended cache 118) can denote the response time (e.g., exponential average or simple average) observed on extended cache 118. rt(object store 120) can denote the response time (e.g., exponential average or simple average) observed on extended cache 118.

In 304, extended cache manger 116 determines a transaction type of the database transaction. For example, extended cache manger 116 can determine whether the database transaction is a read-only transaction or an update transaction.

In 306, extended cache manger 116 determines a phase of the database transaction based on the determined transaction type. For example, extended cache manger 116 can determine whether the phase is an execution phase or a commit phase.

In 308, extended cache manger 116 applies a caching policy to extended cache 118 for the written pages based on the determined transaction type of the database transaction and the determined phase of the database transaction.

Extended cache manager 116 can apply a write-back cache policy to extended cache 118 based on the determined transaction type being an update transaction and the determined phase being an execution phase. Extended cache manager 116's applying of the write-back cache policy to extended cache 118 can cause the pages to be written from buffer cache 114 to extended cache 118 to be written to extended cache 118 synchronously. Extended cache manager 116's applying of the write-back cache policy to extended cache 118 can also cause the pages to be written from buffer cache 114 to object store 120 to be written to object store 120 asynchronously.

Extended cache manager 116 can apply a write-through cache policy to extended cache 118 based on the determined transaction type being an update transaction and the determined phase being a commit phase. Extended cache manager 116's applying of the write-through cache policy to extended cache 118 can cause the pages to be written from buffer cache 114 to extended cache 118 to be written to extended cache 118 asynchronously. Extended cache manager 116's applying of the write-through cache policy to extended cache 118 can also cause the pages to be written from buffer cache 114 to object store 120 to be written to object store 120 synchronously.

Figure 4:
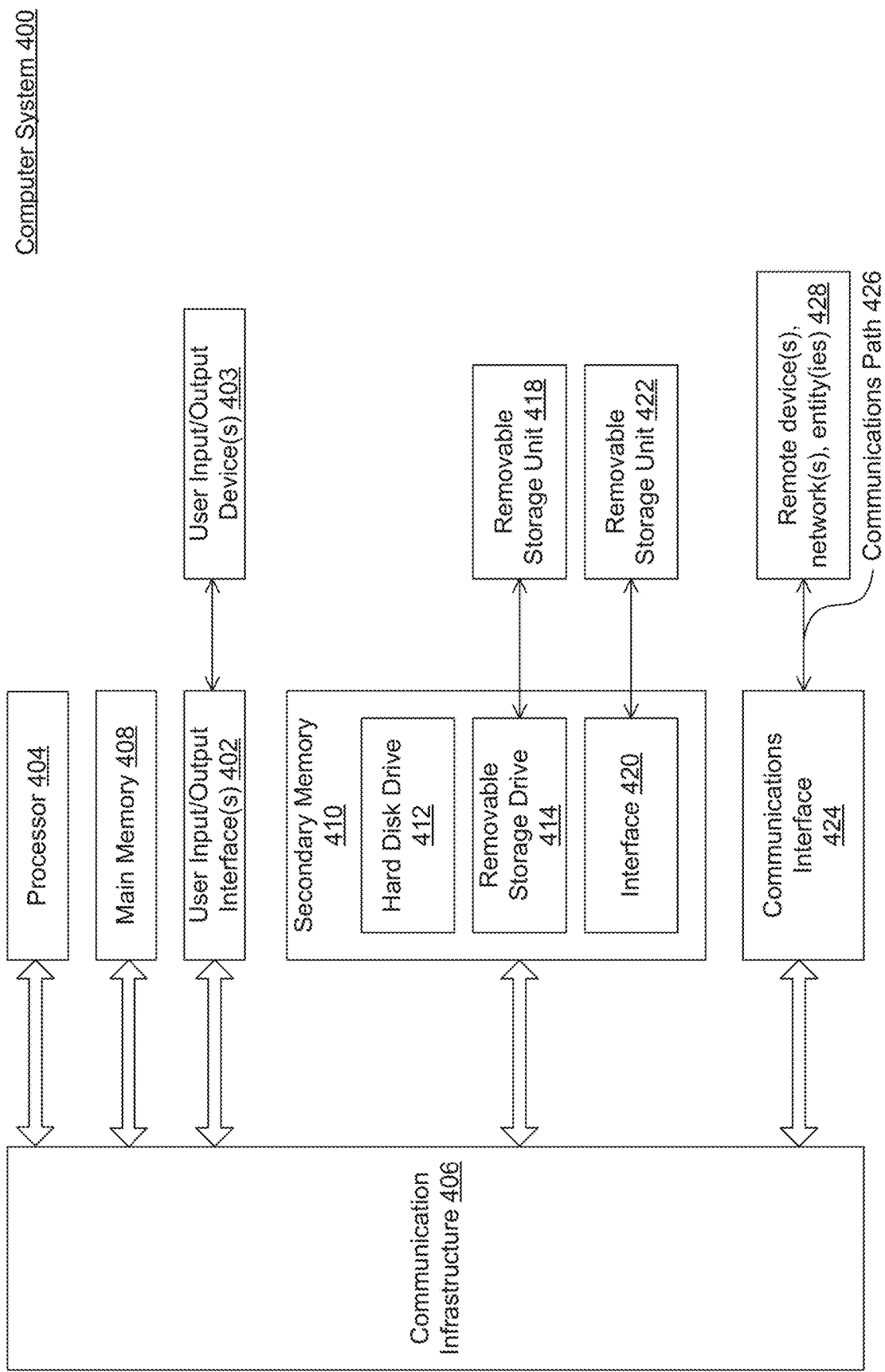
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. For example, computer system 400 may be used to implement method 300.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for using an extended cache to access an object store efficiently, comprising:
    executing, by at least one processor, a database transaction, wherein executing the database transaction causes pages to be written from a buffer cache to the extended cache and to the object store;
    determining, by the at least one processor, a transaction type of the database transaction, wherein the transaction type is a read-only transaction or an update transaction;
    determining, by the at least one processor, a phase of the database transaction based on the determined transaction type, wherein the phase is an execution phase or a commit phase; and
    applying, by the at least one processor, a caching policy to the extended cache for the pages based on the determined transaction type of the database transaction and the determined phase of the database transaction,
    wherein at least one of the executing, determining the transaction type, determining the phase, and applying are performed by one or more computers.

2. The method of claim 1, further comprising:
    storing, by the at least one processor, a page associated with the database transaction in the extended cache as a file, wherein storing the page comprises:
        generating, by the at least one processor, a hash value of an object key of the page using a hash function;
        converting, by the at least one processor, the hash value to a radix value based on a first maximum value, wherein the first maximum value represents a maximum number of subdirectories allowed in a directory;
        generating, by the at least one processor, a directory path based on the radix value and a second maximum value, wherein the second maximum value represents a maximum height of a directory tree; and
        storing, by the at least one processor, the page in the extended cache based on the directory path.

3. The method of claim 1, wherein the applying further comprises:
    applying, by the at least one processor, a write-back cache policy to the extended cache based on the determined transaction type being the update transaction and the determined phase being the execution phase, wherein applying the write-back cache policy to the extended cache causes the pages written from the buffer cache to be written to the extended cache synchronously, and causes the pages evicted from the buffer cache to be written to the object store asynchronously.

4. The method of claim 1, wherein the applying further comprises:
applying, by the at least one processor, a write-through cache policy to the extended cache based on the determined transaction type being the update transaction and the determined phase being the commit phase, wherein applying the write-through cache policy to the extended cache causes the pages written from the buffer cache to be written to the extended cache asynchronously, and causes the pages evicted from the buffer cache to be written to the object store synchronously.

5. The method of claim 1, further comprising:
randomly selecting, by the at least one processor, a first subset of prefetched pages from a set of prefetched pages in the object store based on a ratio between a size of the buffer cache to a total cache size, wherein the total cache size is based on the size of the buffer cache and a size of the extended cache;
selecting, by the at least one processor, a second subset of prefetched pages from the set of prefetched pages in the object store based on the second subset of prefetched pages being absent in the first subset of prefetched pages;
storing, by the at least one processor, the first subset of prefetched pages in the buffer cache; and
storing, by the at least one processor, the second subset of prefetched pages in the extended cache.

6. The method of claim 1, further comprising:
determining, by the at least one processor, a first input/output (I/O) response time to the extended cache;
determining, by the at least one processor, a second PO response time to the object store; and
redirecting, by the at least one processor, a percentage of I/O requests for the extended cache to the object store based on the first I/O response time, the second I/O response time, and a minimum value, wherein the minimum value represents a minimum percentage of I/O requests to be redirected to the object store.

7. The method of claim 1, further comprising:
moving, by the at least one processor, a page from the buffer cache to the extended cache based on a least recently used (LRU) policy.

8. A system, comprising:
a buffer cache;
an extended cache; and
at least one processor coupled to the buffer cache and the extended cache and configured to:
execute a database transaction, wherein executing the database transaction causes pages to be written from the buffer cache to the extended cache and to an object store;
determine a transaction type of the database transaction, wherein the transaction type is a read-only transaction or an update transaction;
determine a phase of the database transaction based on the determined transaction type, wherein the phase is an execution phase or a commit phase; and
applying a caching policy to the extended cache for the pages based on the determined transaction type of the database transaction and the determined phase of the database transaction.

9. The system of claim 8, wherein the at least one processor is further configured to:
store a page associated with the database transaction in the extended cache as a file, wherein to store the page, the at least one processor is further configured to:
generate a hash value of an object key of the page using a hash function;
convert the hash value to a radix value based on a first maximum value, wherein the first maximum value represents a maximum number of subdirectories allowed in a directory;
generate a directory path based on the radix value and a second maximum value, wherein the second maximum value represents a maximum height of a directory tree; and
storing the page in the extended cache based on the directory path.

10. The system of claim 8, wherein to apply the caching policy to the extended cache, the at least one processor is configured to:
apply a write-back cache policy to the extended cache based on the determined transaction type being the update transaction and the determined phase being the execution phase, wherein applying the write-back cache policy to the extended cache causes the pages written from the buffer cache to be written to the extended cache synchronously, and causes the pages evicted from the buffer cache to be written to the object store asynchronously.

11. The system of claim 8, wherein to apply the caching policy to the extended cache, the at least one processor is configured to:
apply a write-through cache policy to the extended cache based on the determined transaction type being the update transaction and the determined phase being the commit phase, wherein applying the write-through cache policy to the extended cache causes the pages written from the buffer cache to be written to the extended cache asynchronously, and causes the pages evicted from the buffer cache to be written to the object store synchronously.

12. The system of claim 8, wherein the at least one processor is further configured to:
randomly select a first subset of prefetched pages from a set of prefetched pages in the object store based on a ratio between a size of the buffer cache to a total cache size, wherein the total cache size is based on the size of the buffer cache and a size of the extended cache;
select a second subset of prefetched pages from the set of prefetched pages in the object store based on the second subset of prefetched pages being absent in the first subset of prefetched pages;
store the first subset of prefetched pages in the buffer cache; and
store the second subset of prefetched pages in the extended cache.

13. The system of claim 8, wherein the at least one processor is further configured to:
determine a first input/output (I/O) response time to the extended cache;
determine a second I/O response time to the object store; and
redirect a percentage of I/O requests for the extended cache to the object store based on the first I/O response time, the second I/O response time, and a minimum value, wherein the minimum value represents a minimum percentage of I/O requests to be redirected to the object store.

14. The system of claim 8, wherein the at least one processor is further configured to:
- move a page from the buffer cache to the extended cache based on a least recently used (LRU) policy.

15. A non-transitory computer-readable medium having instructions stored thereon that, when executed by at least one computing device, cause the at least one computing device to perform operations comprising:
- executing a database transaction, wherein executing the database transaction causes pages to be written from a buffer cache to an extended cache and to an object store;
- determining a transaction type of the database transaction, wherein the transaction type is a read-only transaction or an update transaction;
- determining a phase of the database transaction based on the determined transaction type, wherein the phase is an execution phase or a commit phase; and
- applying a caching policy to the extended cache for the pages based on the determined transaction type of the database transaction and the determined phase of the database transaction.

16. The non-transitory computer-readable medium of claim 15, wherein the operations further comprise:
- storing a page associated with the database transaction in the extended cache as a file, wherein storing the page comprises:
  - generating a hash value of an object key of the page using a hash function;
  - converting the hash value to a radix value based on a first maximum value, wherein the first maximum value represents a maximum number of subdirectories allowed in a directory;
  - generating a directory path based on the radix value and a second maximum value, wherein the second maximum value represents a maximum height of a directory tree; and
  - storing the page in the extended cache based on the directory path.

17. The non-transitory computer-readable medium of claim 15, wherein the applying further comprises:
- applying a write-back cache policy to the extended cache based on the determined transaction type being the update transaction and the determined phase being the execution phase, wherein applying the write-back cache policy to the extended cache causes the pages written from the buffer cache to be written to the extended cache synchronously, and causes the pages evicted from the buffer cache to be written to the object store asynchronously.

18. The non-transitory computer-readable medium of claim 15, wherein the applying further comprises:
- applying a write-through cache policy to the extended cache based on the determined transaction type being the update transaction and the determined phase being the commit phase, wherein applying the write-through cache policy to the extended cache causes the pages written from the buffer cache to be written to the extended cache asynchronously, and causes the pages evicted from the buffer cache to be written to the object store synchronously.

19. The non-transitory computer-readable medium of claim 15, wherein the operations further comprise:
- randomly selecting a first subset of prefetched pages from a set of prefetched pages in the object store based on a ratio between a size of the buffer cache to a total cache size, wherein the total cache size is based on the size of the buffer cache and a size of the extended cache;
- selecting a second subset of prefetched pages from the set of prefetched pages in the object store based on the second subset of prefetched pages being absent in the first subset of prefetched pages;
- storing the first subset of prefetched pages in the buffer cache; and
- storing the second subset of prefetched pages in the extended cache.

20. The non-transitory computer-readable medium of claim 15, wherein the operations further comprise:
- determining a first input/output (I/O) response time to the extended cache;
- determining a second I/O response time to the object store; and
- redirecting a percentage of I/O requests for the extended cache to the object store based on the first I/O response time, the second I/O response time, and a minimum value, wherein the minimum value represents a minimum percentage of I/O requests to be redirected to the object store.

* * * * *